July 14, 1925.

C. O. MATHEWS 1,545,592

SHADE FOR AUTOMOBILE WINDSHIELDS

Filed Nov. 18, 1924

Inventor
Charles O. Mathews
by
Attorney

Patented July 14, 1925.

1,545,592

UNITED STATES PATENT OFFICE.

CHARLES O. MATHEWS, OF DEVON, CONNECTICUT.

SHADE FOR AUTOMOBILE WINDSHIELDS.

Application filed November 18, 1924. Serial No. 750,532.

*To all whom it may concern:*

Be it known that I, CHARLES O. MATHEWS, a citizen of the United States, residing at the town of Devon, in the county of New Haven and State of Connecticut, have invented certain new and useful Improvements in Shades for Automobile Windshields; and I do declare the following to be a full, clear, and exact description of the invention, such as will enable others skilled in the art to which it appertains to make and use the same.

This invention relates to certain improvements in automobile shades, but more particularly shades for the windshield of an automobile, and has for its objects to shut off sun glare and the blinding rays from approaching head lights; to enable the shade to be rolled up by a slight pull on a drop cord; and to prevent flapping or bellying of the shade when exposed to the wind that comes in through an open windshield.

With these ends in view this invention consists of certain constructions hereinafter fully described and then specifically designated by the claims.

In the accompanying drawing

Figure 1:
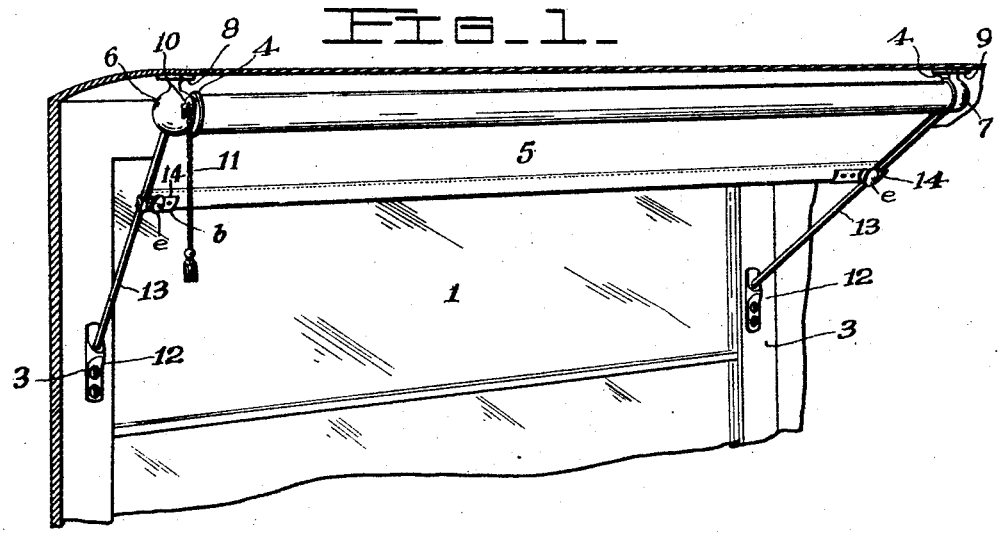

Figure 1 is a perspective view broken away showing the front of an automobile equipped with this improvement—

Figure 2:
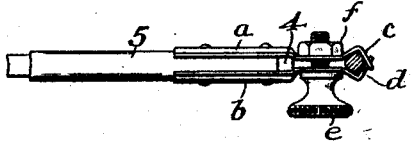
Figure 3:
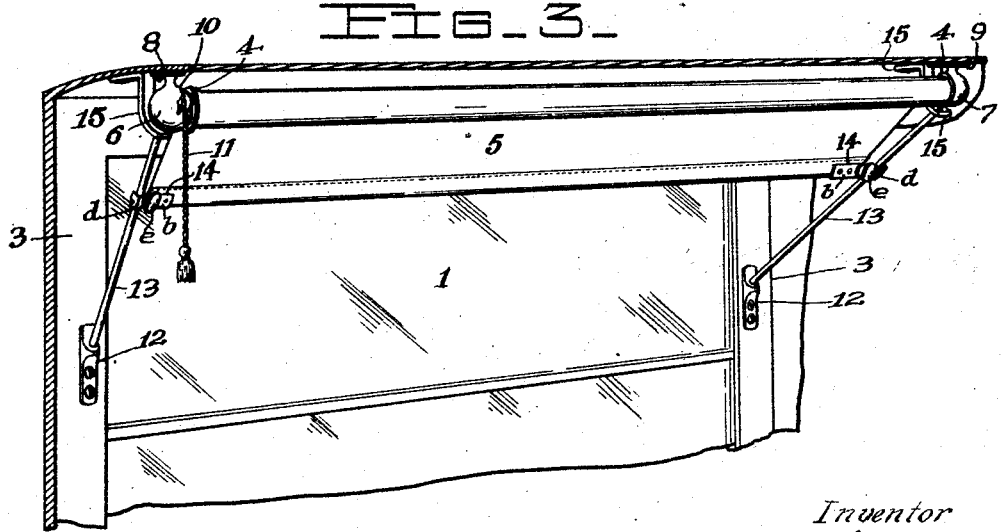

Figure 2 a detail cross section through one of the guide rods showing particularly the runner clip, and Figure 3 is a view similar to Figure 1 but showing a modified form of this improvement.

Similar numerals of reference denote like parts in the several figures of the drawing.

1 represents an ordinary windshield of an automobile, 2 the roof thereof, and 3 the front corner posts.

4 is an ordinary form of spring roller, and 5 a shade carried thereby.

6, 7, are ball shaped fixtures within which the shade roller is journaled, the bases 8, 9, of which fixtures are secured to the roof of an automobile at a predetermined distance in the rear of the corner posts 3.

The particular form of shade roller which I prefer to use is known as the "trigger" roller, in which the teeth carried by one end of the shaft of the roller are engaged by a trigger whose outer end extends through the fixture 6 and is provided with any suitable drop cord by means of which the trigger may be released from engagement with said teeth, and it is therefore not necessary to enter into any description of the roller so far as said trigger and teeth are concerned.

In this connection I will merely state that the end of the trigger, denoted by the numeral 10, extends from the fixture 6 and is provided with a drop cord 11 the pulling of which releases the trigger and allows the shade to roll up.

12 are fixtures secured to the front corner posts 3 at a suitable distance below the plane of the roller, and 13 are guide rods whose lower extremities are connected with these fixtures 12 and whose upper extremities are connected with the fixtures 6, 7, so that it will be clear that these guide rods incline forwardly and downwardly from the shade roller.

14 are what I term runner clamps and which, referring to Figure 2, comprise two resilient members *a*, *b*, that are secured to the ends of the lower part of the shade and whose outer extremities are bent and formed into clamping members *c*, *d*, a thumb screw *e* passing through the members and engaging a nut *f* serving as the means to operate said members as a clamp.

These runner clamps embrace the guide rods 13, and are intended to slide freely thereon, so that when the shade is pulled down it will be properly guided by the connection of these runner clamps with the rods 13, and the thumb nut *e* is operated to clamp the members *c*, *d*, firmly to the rods 13 so that the shade may be held secure as against flapping or bellying.

Therefore, it will be understood that these runner clamps serve as travelers or runners on the rods 13 so that the shade may be readily moved in either direction up or down and properly guided, and also serve as clamps in the manner above described.

Instead of securing the upper extremities of the rods 13 directly to the fixtures 6, 7, that are a part of the shade roller construction, separate fixtures 15 may be provided that are secured to the roof of the automobile adjacent the fixtures 6, 7, and the upper ends of these rods may then be connected to these special fixtures, as shown at Figure 3, and therefore I do not wish to be limited to any special fixtures to which the upper ends of the rods 13 may be connected.

In the construction shown at Figure 3 the runner clamps embrace the rods and the operation of the construction is in all respects precisely the same as that which characterize the construction shown at Figure 1.

What is claimed is:—

1. An inside shade for the front of an automobile, comprising a spring shade roller journaled in fixtures that depend from the roof of the automobile at a predetermined distance from the front thereof, guide rods adjacent said fixtures and inclined downwardly toward said front, the extremities of which rods are fixed respectively to said roof and to the front corner posts of the automobile, a shade carried by said roller, runner clamps carried by the lower ends of the shade and embracing said rods, and means for releasing the shade.

2. An inside shade for an automobile front, comprising downwardly inclined guide rods whose upper extremities are fixed to the automobile roof and whose lower extremities are fixed to the front corner posts, a spring shade roller journaled adjacent said upper extremities and having a release trigger, a shade carried by said roller, runner clamps carried by the lower ends of said shade and embracing said rods whereby the shade when pulled down is inclined downwardly and held in any desired adjustment by the manipulation of said clamps, and means attached to the roller trigger for releasing the shade.

In testimony whereof I affix my signature hereto.

CHARLES O. MATHEWS. [L. S.]